UNITED STATES PATENT OFFICE.

JOHN E. KING, OF GROSSE POINTE, MICHIGAN.

METHOD OF GRINDING AND PACKING COFFEE.

14,520. Specification of Reissued Letters Patent. Reissued Sept. 10, 1918.

No Drawing. Original No. 1,263,434, dated April 23, 1918, Serial No. 202,768, filed November 19, 1917.
Application for reissue filed July 8, 1918. Serial No. 243,961.

*To all whom it may concern:*

Be it known that I, JOHN E. KING, a citizen of the United States of America, residing at Grosse Pointe, in the county of Wayne and State of Michigan, have invented certain new and useful Improvements in Methods of Grinding and Packing Coffee, of which the following is a specification.

This invention relates to a process of preparing roasted coffee for consumption. It has for its object a process of preparing coffee which will secure the best results as regards both packing and making the coffee infusion or decoction.

It has been observed that very finely ground or powdered roasted coffee has the capacity of making a better cup of coffee as regards extracting from the ground coffee berries the non-volatile constituents, but on the other hand finely ground coffee loses a great deal of its volatile constituents during grinding and completely powdered coffee loses practically all the volatile constituents during grinding. These volatile constituents are very often referred to as the caffeol in the coffee and are very complex compounds. Their exact chemical formulas have not been determined with accuracy. Caffeol is really what gives the coffee its pleasing flavor and odor. It is generally spoken of as the aroma. It has been recognized that coarsely ground coffee loses less aroma during grinding than finely ground coffee, but as a matter of fact coarsely ground coffee if allowed to stand loses more of the aroma than finely ground coffee and in time practically all, for the coffee-beans are cracked and the interior surface exposed and this allows the escape of the caffeol where gases may circulate in the interstices made possible by coarsely ground coffee. This is especially true if the coffee is packed in the usual container in which the coffee is delivered to the grocery trade.

I have discovered that by grinding coffee so that 10% of the coffee is what is generally styled coarse ground coffee and 90% what is generally styled finely ground coffee, very much better and unexpected results are secured in the final coffee solution or extract.

The new and unexpected results are these: Where coffee is ground and packed in accordance with my process the 10% coarse ground coffee will furnish all the aromatic properties necessary to give pleasing results and in fact all that can be detected, giving substantially the same results as regards the aromas as though 100% coarsely ground coffee were used. On the other hand, the 90% proportion, or approximation of this proportion, serves to furnish the non-volatile constituents in a most economical form, namely in which they may be extracted in the solution in the largest amount per unit of coffee. Not only is this advantage secured but the 90% finely ground coffee gives to the 10% an efficacy that it would not otherwise have in retaining the caffeol left after grinding. This result is accomplished because the finely ground coffee closely packs around the coarsely ground coffee, filling up the interstices, which ordinarily exist between the grains of coarsely ground coffee, permitting free circulation of gases and air which aid in the escape of the caffeol.

It is, therefore, apparent that not only does this mixture secure the greatest economy in extracting the non-volatile constituents of the coffee but the finely ground proportion co-acts with the coarse proportion to retain the aroma in its original form in the coarsely ground grains. The grindings in the approximate proportions indicated can be effected by apparatus adjusted to make the two grindings in substantially these proportions, or could conceivably be carried on by using two coffee-mills adjusted for the finely ground and the coarse grinding and packing the coffee in the proportions given.

The National Coffee Roasters Association have established certain standards of grinds, namely, coarse, medium, fine, fine like corn meal, and powdered. The standards are not definitely defined but are made known to those engaged in the coffee business by distribution of so called "educational" samples of the various grinds. I prefer to use a grind in between this standard "fine" and "fine like corn meal," but of course the good results *pro tanto* can be accomplished by varying from this standard. In the claims I shall use the term "finely ground" in its popular significance to cover "fine," "fine like corn meal" or "powdered" of the Coffee Roasters Standard.

What I claim is:

1. The method of preparing and packing ground coffee, which consists in coarsely grinding approximately 10% of the coffee and finely grinding approximately 90% of the coffee and packing the two grinds in one package or container, for the purpose specified.

2. The method of preparing ground coffee, which consists in contemporaneously grinding about 10% of the coffee coarse and 90% fine and packing the two grinds together in a single package, for the purpose specified.

3. A composition of ground coffee, which consists in approximately 10% of the coffee ground coarsely and 90% of the coffee ground finely, for the purpose specified.

In witness whereof I have hereunto set my hand this 2nd day of July, 1918.

JOHN E. KING.